(12) United States Patent
Chen et al.

(10) Patent No.: US 10,749,652 B2
(45) Date of Patent: Aug. 18, 2020

(54) METHODS AND APPARATUS FOR EMPLOYING MULTIPLE SUBFRAME CONFIGURATIONS FOR HARQ OPERATIONS

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 825 days.

(21) Appl. No.: 14/245,173

(22) Filed: Apr. 4, 2014

(65) Prior Publication Data

US 2014/0307595 A1 Oct. 16, 2014

Related U.S. Application Data

(60) Provisional application No. 61/811,640, filed on Apr. 12, 2013.

(51) Int. Cl.
*H04L 5/00* (2006.01)
*H04L 5/14* (2006.01)
*H04L 1/18* (2006.01)

(52) U.S. Cl.
CPC ............ *H04L 5/0051* (2013.01); *H04L 1/188* (2013.01); *H04L 1/1864* (2013.01);
(Continued)

(58) Field of Classification Search
CPC ........... H04L 5/14; H04L 5/0094–0098; H04L 5/0055
See application file for complete search history.

(56) References Cited

U.S. PATENT DOCUMENTS

2012/0300641 A1* 11/2012 Chen ................. H04L 1/0026
370/241
2013/0039231 A1* 2/2013 Wang ................. H04W 72/10
370/280
(Continued)

FOREIGN PATENT DOCUMENTS

| JP | 2015510700 A | 4/2015 |
| WO | WO-2013002562 A2 | 1/2013 |
| WO | 2013111607 A1 | 8/2013 |

OTHER PUBLICATIONS

Nokia Siemens Networks., et al., "Reference Configuration Method for Dynamic UL-DL Reconfiguration," 3GPP Draft; R1-131225, 3rd Generation Partnership Project (3GPP), Mobile Competence Centre; 650, Route Des Lucioles; F-06921 Sophia-Antipolis Cedex; France, vol. RAN WG1, No. Chicago, US; Apr. 15, 2013-Apr. 19, 2013; Apr. 6, 2013 (Apr. 6, 2013); XP050697131; 4 pages.
(Continued)

Primary Examiner — Marcus Smith

(57) ABSTRACT

Certain aspects of the present disclosure relate to methods and apparatus for employing multiple subframe configurations. A UE may identify a first reference subframe configuration (RSC) to use as a reference for hybrid automatic repeat request (HARQ) operations for transmissions on an uplink, and a second RSC to use as a reference for HARQ operations for transmissions on a downlink. The UE may communicate with at least a node on the uplink and the downlink based on the first and second RSCs. In aspects, a base station (BS) may identify a first RSC to use as a reference for HARQ operations for transmissions on an uplink, identify a second RSC to use as a reference for HARQ operations for transmissions on a downlink, and communicate with at least one UE on the uplink and the downlink based on the first and second RSCs.

25 Claims, 13 Drawing Sheets

(52) U.S. Cl.
CPC .......... *H04L 1/1887* (2013.01); *H04L 1/1896* (2013.01); *H04L 5/0028* (2013.01); *H04L 5/14* (2013.01)

(56) References Cited

U.S. PATENT DOCUMENTS

| | | | |
|---|---|---|---|
| 2013/0083706 A1 | 4/2013 | Lin | |
| 2013/0194980 A1* | 8/2013 | Yin | H04L 1/1854 370/280 |
| 2013/0194981 A1* | 8/2013 | Wang | H04L 1/1671 370/280 |
| 2014/0086112 A1* | 3/2014 | Stern-Berkowitz | H04W 72/1289 370/280 |
| 2014/0112217 A1 | 4/2014 | Ahn et al. | |
| 2014/0301255 A1* | 10/2014 | Yin | H04L 5/14 370/280 |

OTHER PUBLICATIONS

Catt: "Design of TDD Inter-band Carrier Aggregation",3GPP Draft; R1-113724, 3rd Generation Partnership Project (3GPP), Mobile Competence Centre ; 650, Route Des Lucioles; F-06921 Sophia-Antipolis Cedex; France, vol. RAN WG1, No. San Francisco; Nov. 14, 2011-Nov. 18, 2011, Nov. 8, 2011 (Nov. 8, 2011),XP050561843.
International Search Report and Written Opinion—PCT/US2014/033108—ISA/EPO—dated Aug. 8, 2014.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Uplink-downlink configurations

FIG. 7

METHODS AND APPARATUS FOR EMPLOYING MULTIPLE SUBFRAME CONFIGURATIONS FOR HARQ OPERATIONS

CLAIM OF PRIORITY UNDER 35 U.S.C. § 119

This application claims priority to U.S. Provisional Application Ser. No. 61/811,640, filed on Apr. 12, 2013, which is expressly incorporated by reference herein in its entirety.

FIELD

The present disclosure relates generally to wireless communication, and more particularly, to methods and apparatus for employing multiple subframe configurations for HARQ operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes identifying a first reference subframe configuration to use as a reference for hybrid automatic repeat request (HARQ) operations for transmissions on an uplink, identifying a second reference subframe configuration to use as a reference for HARQ operations for transmissions on a downlink, and communicating with at least a node on the uplink and the downlink based on the first and second reference subframe configurations.

Certain aspects of the present disclosure provide a method for wireless communications by an eNB. The method generally includes identifying a first reference subframe configuration to use as a reference for hybrid automatic repeat request (HARQ) operations for transmissions on an uplink, identifying a second reference subframe configuration to use as a reference for HARQ operations for transmissions on a downlink, and communicating with at least one user equipment (UE) on the uplink and the downlink based on the first and second reference subframe configurations.

Certain aspects of the present disclosure provide an apparatus for wireless communications. The apparatus generally includes a processor and a memory coupled to the processor. The processor is generally configured to.

Certain aspects of the present disclosure provide an apparatus for wireless communications. The apparatus generally includes a processor and a memory coupled to the processor. The processor is generally configured to identify a first reference subframe configuration to use as a reference for hybrid automatic repeat request (HARQ) operations for transmissions on an uplink, identify a second reference subframe configuration to use as a reference for HARQ operations for transmissions on a downlink, and communicate with at least a node on the uplink and the downlink based on the first and second reference subframe configurations identify a first reference subframe configuration to use as a reference for hybrid automatic repeat request (HARQ) operations for transmissions on an uplink, identify a second reference subframe configuration to use as a reference for HARQ operations for transmissions on a downlink, and communicate with at least one user equipment (UE) on the uplink and the downlink based on the first and second reference subframe configurations.

Aspects generally include methods, apparatus, systems, computer program products, and processing systems, as substantially described herein with reference to and as illustrated by the accompanying drawings. "LTE" refers generally to LTE and LTE-Advanced (LTE-A).

BRIEF DESCRIPTION OF THE DRAWINGS

FIG. 7 illustrates an exemplary list of uplink/downlink subframe configurations.

DETAILED DESCRIPTION

Figure 1:
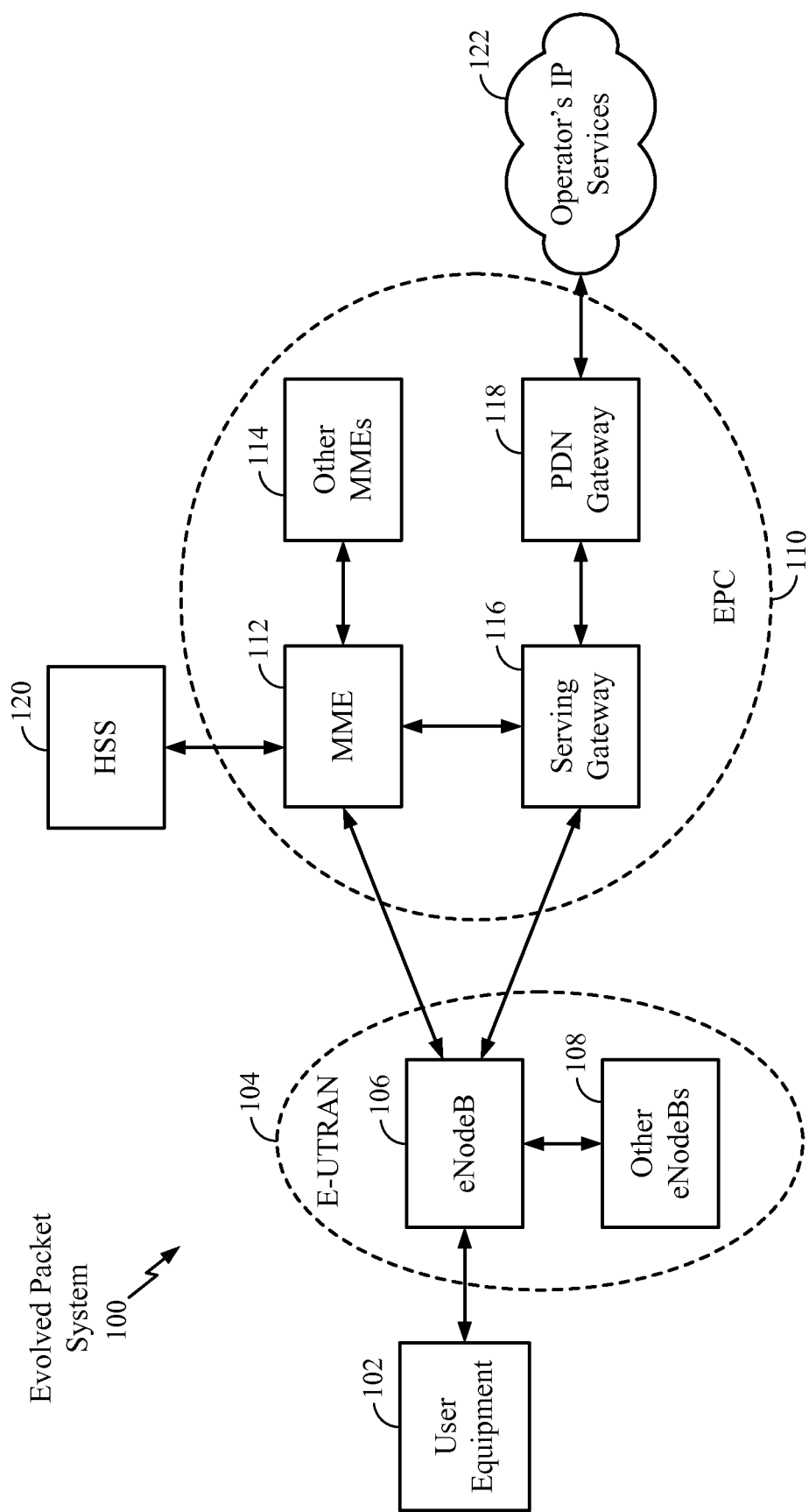
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
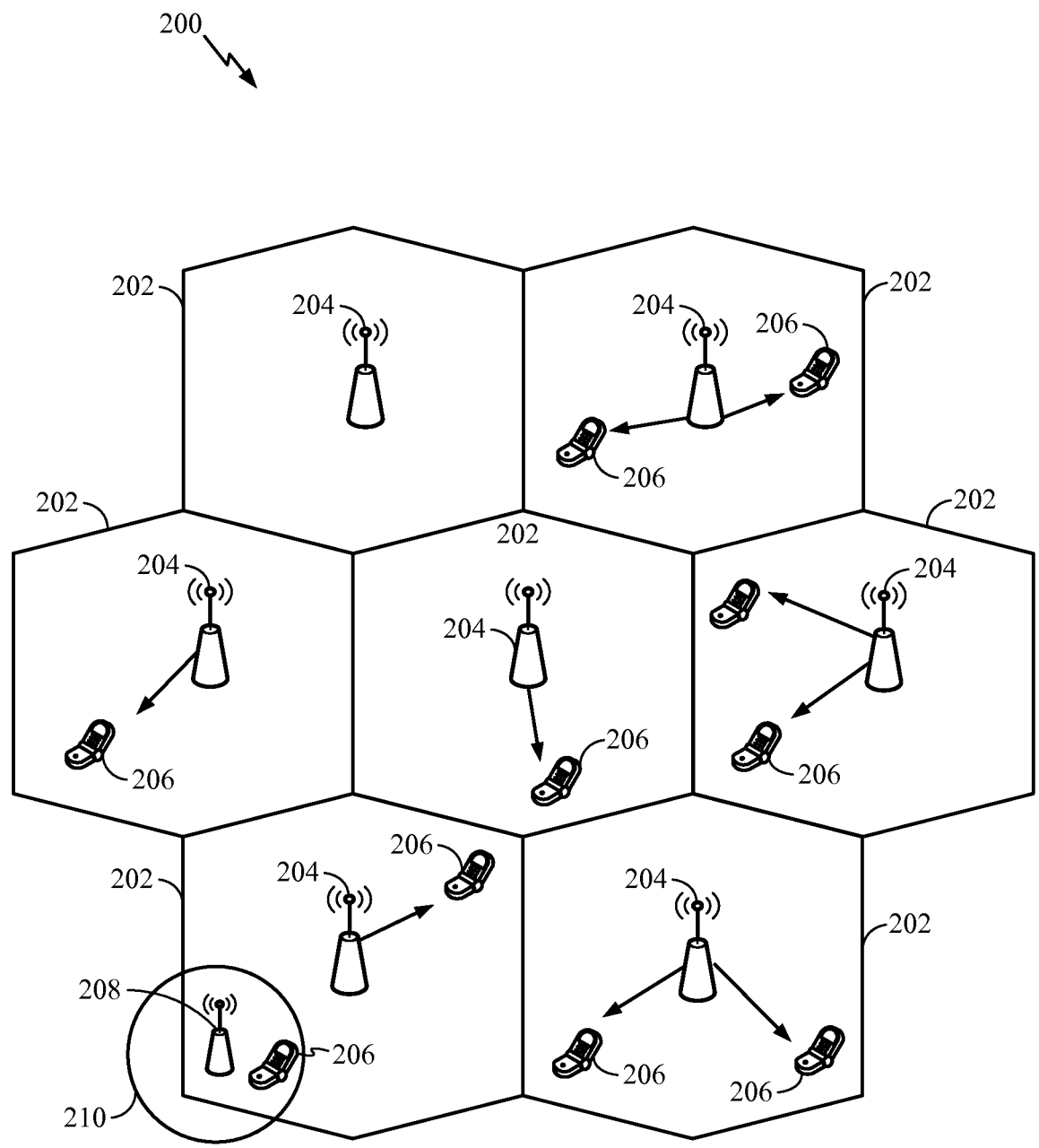
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
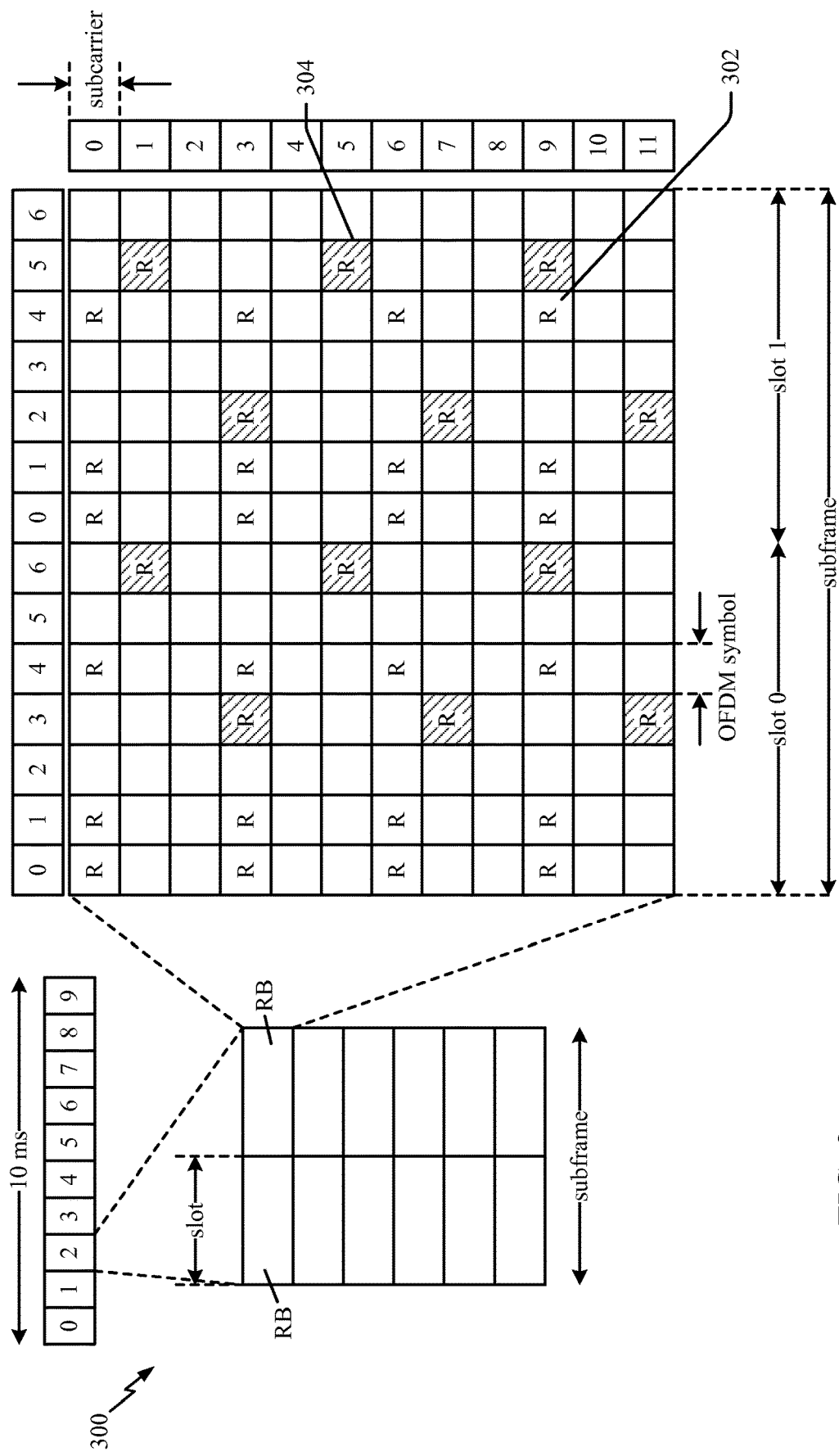
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
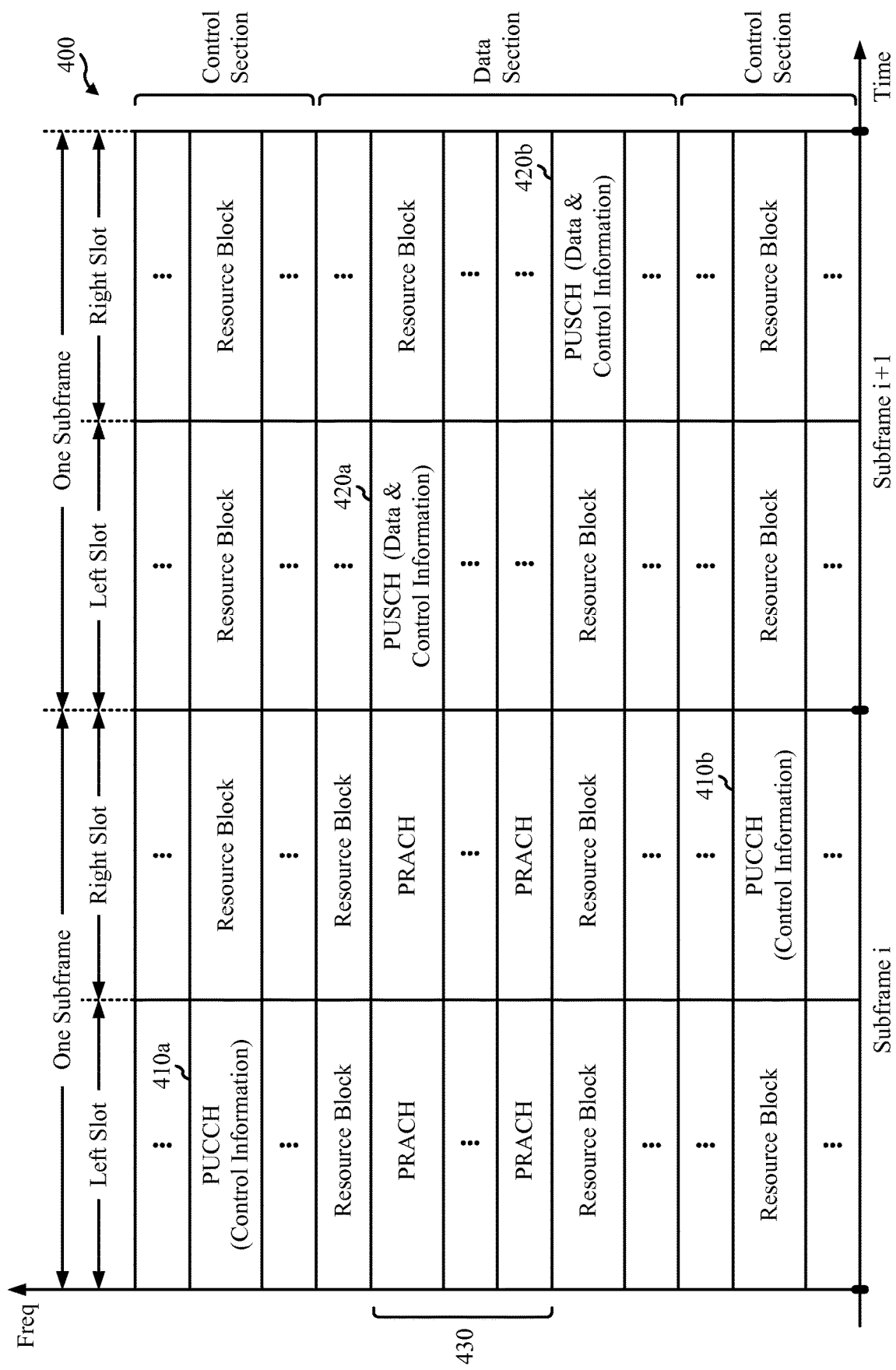
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
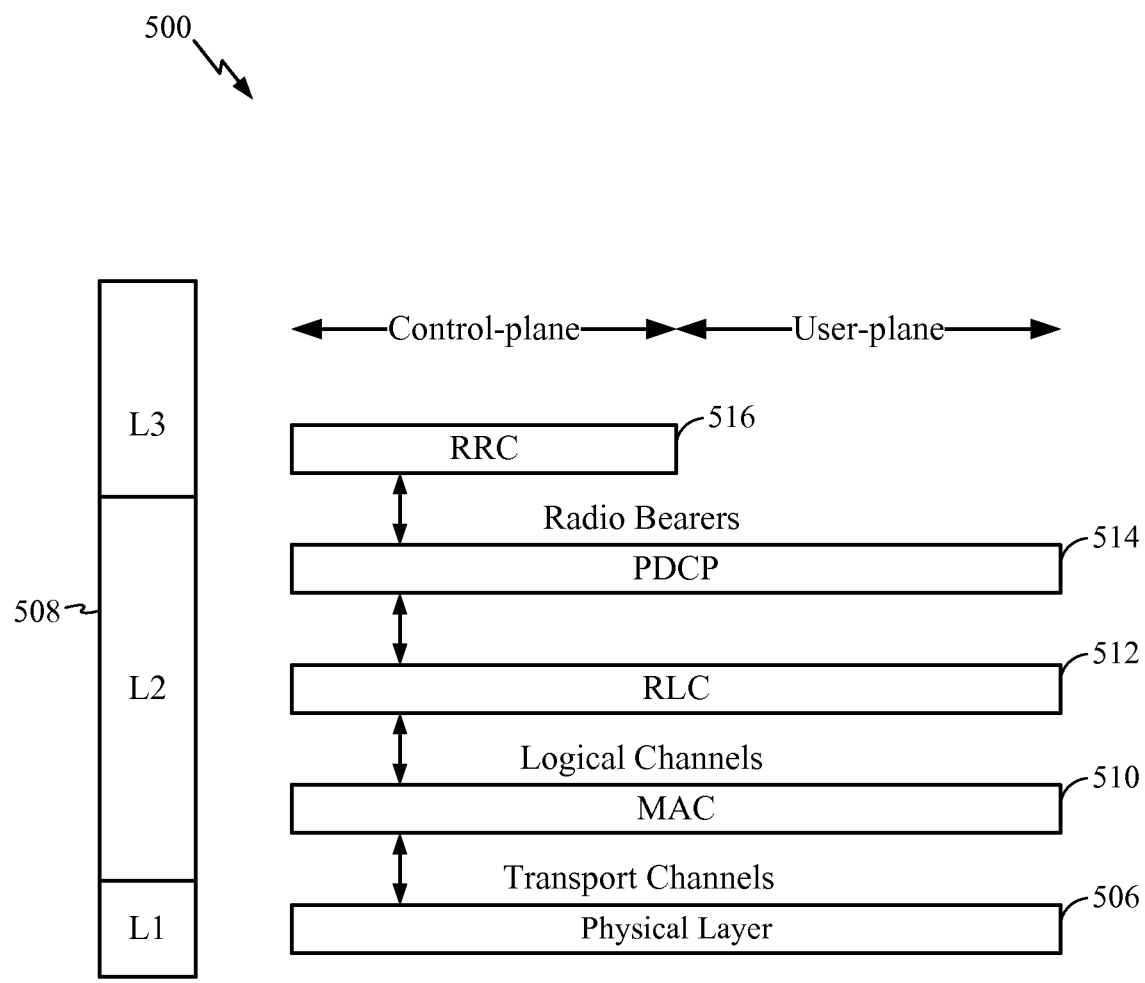
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
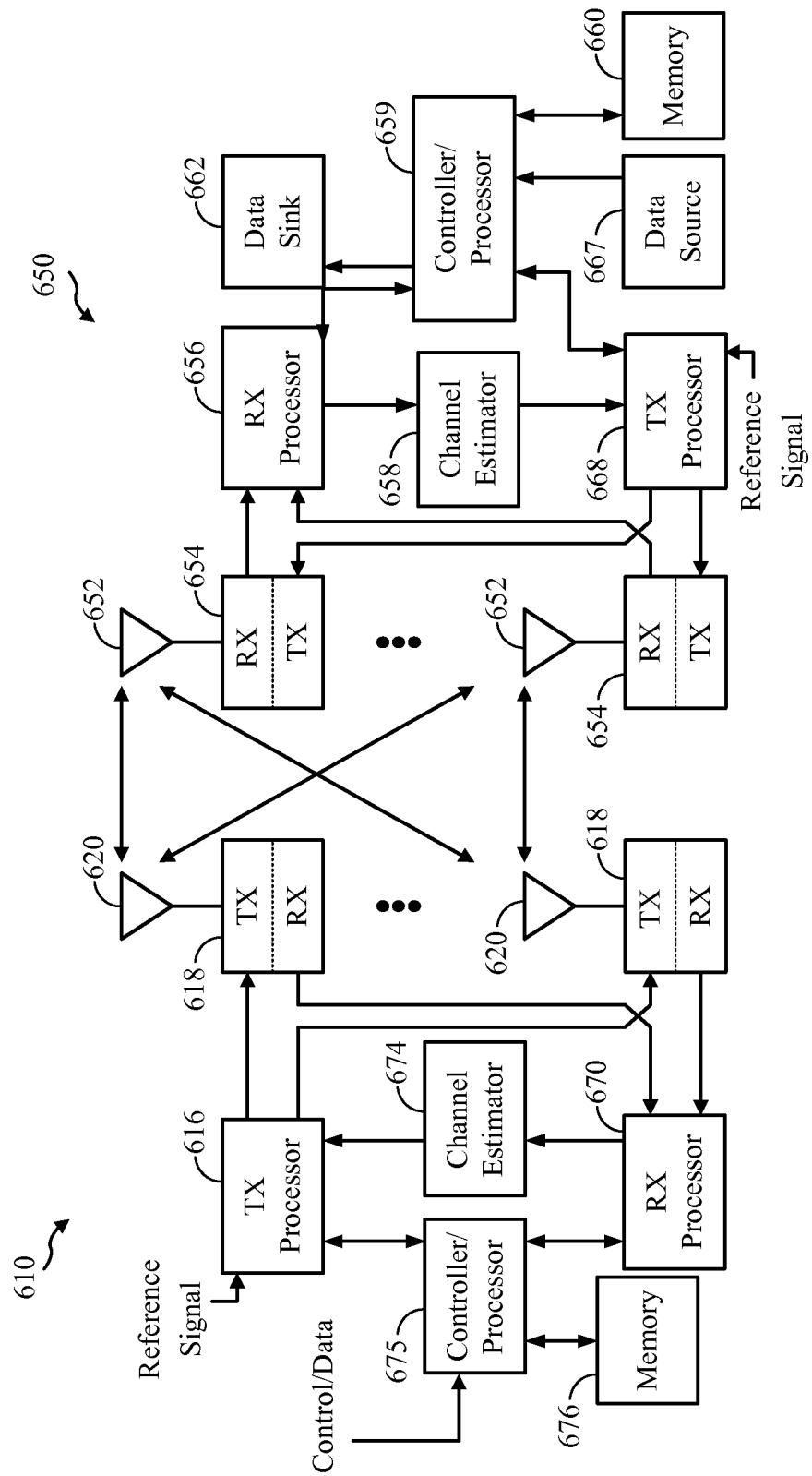
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 1200 in FIGS. 12 and 1400 in FIG. 14, and/or other processes for the techniques described herein, for example. The controller/processor 675 and/or other processors and modules at the eNB 610 may perform or direct operations for example operations 1300 in FIGS. 13 and 1500 in FIG. 15, and/or other processes for the techniques described herein, for example. In aspects, one or more of any of the components shown in FIG. 6 may be employed to perform example operations 1200, 1400 1300, 1500 and/or other processes for the techniques described herein.

Multiple Reference Subframe Configurations for HARQ Operations

Figure 8:
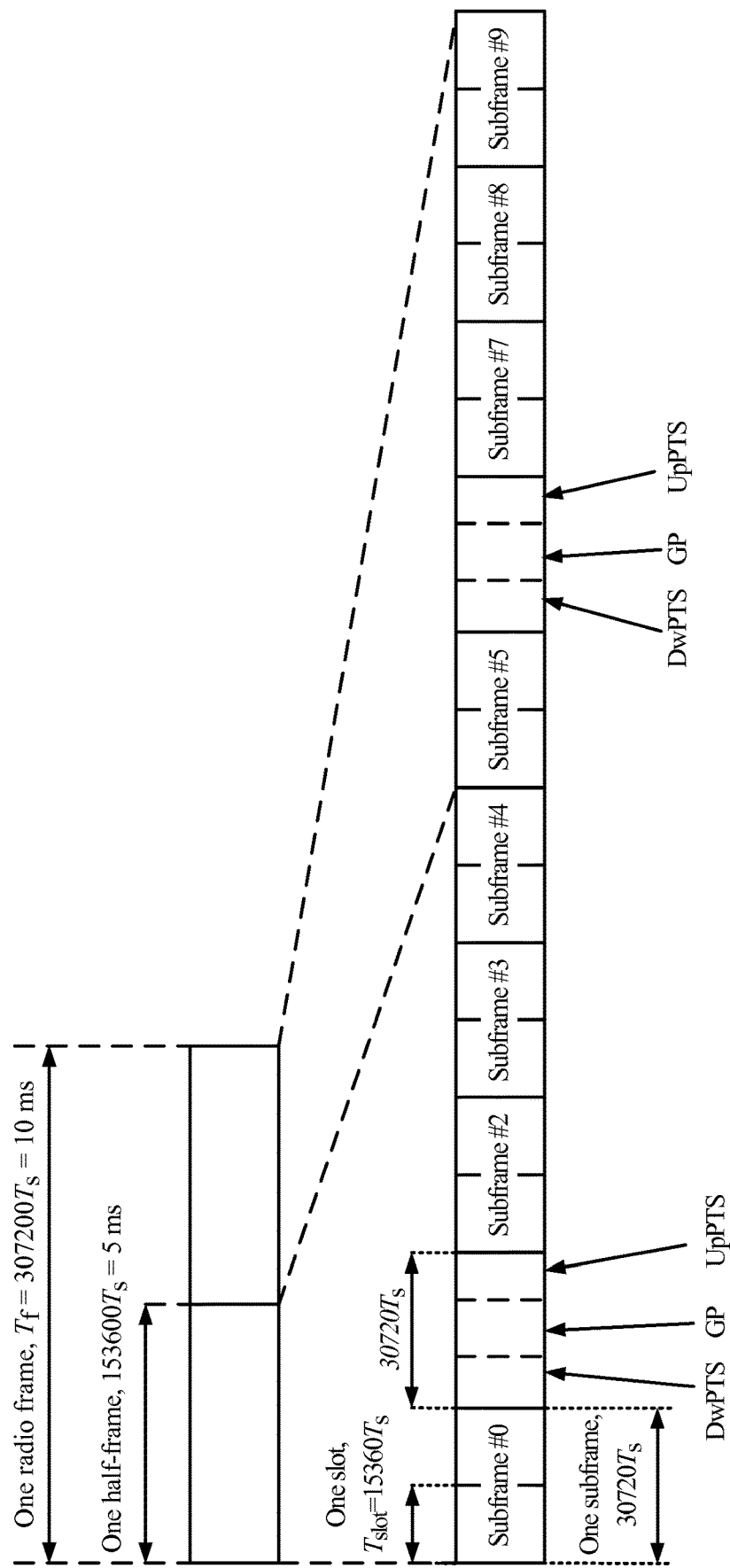
FIG. 8 illustrates an example subframe frame format.

In certain wireless communications networks, such as LTE networks, both FDD and TDD frame structures are supported. For TDD, seven possible DL and UL subframe configurations are supported, as shown in FIG. 7. There may be two switching periodicities, 5 ms and 10 ms. For the 5 ms periodicity, there are typically two special subframes in one frame of 10 ms as illustrated in FIG. 8. For the 10 ms periodicity, there is generally one special subframe in one frame. It may be noted that the methods and apparatus of the present disclosure may be employed when a larger or smaller number of subframe configurations are supported.

In LTE Rel-12, it may be possible to dynamically adapt TDD DL/UL subframe configurations based on actual traffic needs (e.g., also known as evolved interference management for traffic adaptation, eIMTA). If, during a short duration, a large data burst on the downlink is needed, the subframe configuration may be changed, for example, from config #1 (6 DL:4 UL) to config #5 (9 DL:1 UL). In some cases, the adaptation of TDD subframe configuration is expected to be no slower than 640 ms. In an extreme case, the adaptation may be expected to be as fast as 10 ms.

In certain aspects, the adaptation, however, may cause overwhelming interference to both downlink and uplink when two or more cells have different downlink and uplink subframes. In addition, the adaptation may cause some complexity in DL and UL HARQ timing management. Each of the seven DL/UL subframe configurations generally has its own DL/UL HARQ timing. The DL/UL HARQ timing is optimized for each configuration (e.g., in terms of HARQ operation efficiency). For example, the timing from PDSCH to the corresponding ACK/NAK may be different for different TDD DL/UL subframe configurations (e.g., depending on when the next available uplink subframe occurs for sending the ACK/NAK).

Dynamic switching among the seven subframe configurations (e.g., as shown in FIG. 7, or even more, if more flexible adaptation is deemed as necessary) implies that if a current DL/UL HARQ timing is kept, there may be missed ACK/NAK transmission opportunities for some of the DL or UL transmissions.

Figure 9:
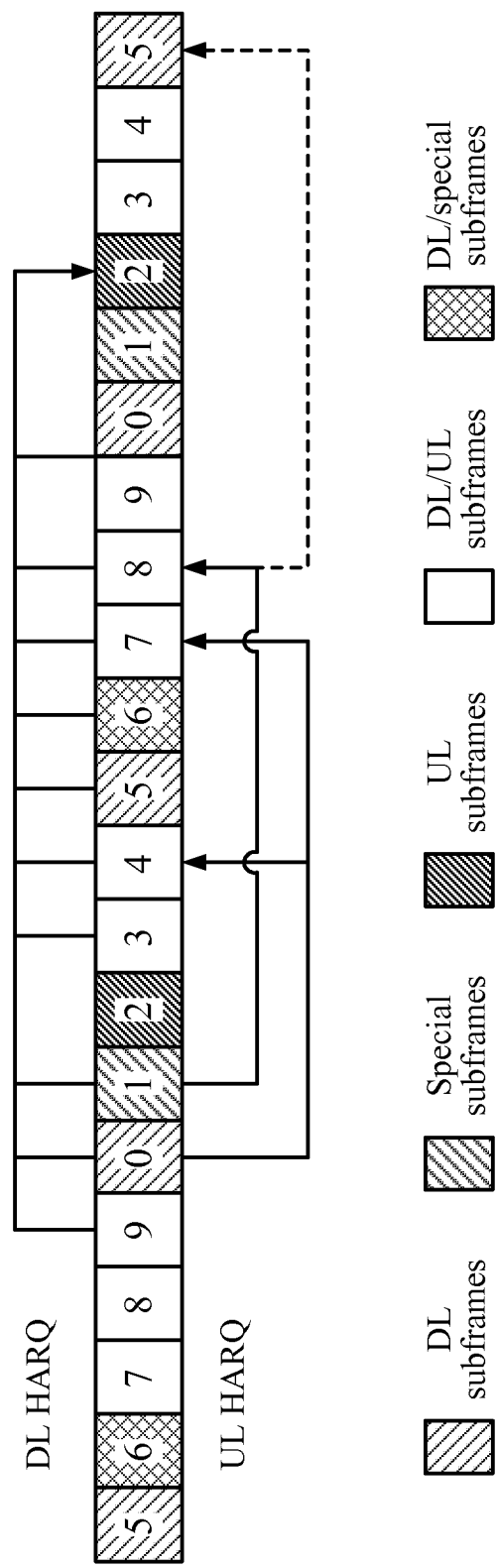
FIG. 9 illustrates an example use of reference uplink/downlink subframe configurations.

In certain aspects, to simplify the operations for eIMTA, it is possible to define a single DL/UL subframe configuration as a reference for many physical layer operations, as shown in FIG. 9. For instance, as shown in FIG. 9, DL HARQ operations may be based on DL/UL subframe configuration #5, regardless of the actual DL/UL subframe configuration in use in a frame (e.g., or half a frame). That is, if dynamic DL/UL subframe configuration is enabled, the DL HARQ timing may always be based on the 9:1 DL/UL subframe configuration #5.

At the same time, in certain aspects, as shown in FIG. 9, UL HARQ operation may be based on DL/UL subframe configuration #0, regardless of the actual DL/UL subframe configuration in use in a frame (e.g., or half a frame). That is, if dynamic DL/UL subframe configuration is enabled, the UL HARQ timing may always be based on the 4:6 DL/UL subframe configuration #0.

The actual usage of a subframe may be subject to eNB scheduling. For example, subframes 3/4/7/8/9 may be either DL or UL subframes, while subframe 6 can be either DL or a special subframe.

In certain aspects, a single reference DL/UL subframe configuration is simple, but may involve some inefficiency, especially when the number of UEs is large. For example, the 9:1 configuration #5 for DL HARQ timing requires ACK/NAK feedback for 9 DL subframes in one UL subframe, causing large UL control overhead. Additionally this may also limit the coverage range. In an aspect, if the UE is configured with DL MIMO, 18-bit ACK/NAK may need to be fed back in one UL subframe. In certain aspects, although spatial bundling may be configured, such that only 9-bit ACK/NAK is feedback, spatial bundling is associated with some DL throughput loss.

Further, the 4:6 subframe configuration #0 for UL HARQ timing requires double PHICH resource reservation, and the need to schedule two UL subframes in one DL subframe. As a result, 2-bit UL scheduling index has to be in UL grants, instead of DAI (Downlink Assignment Index). In certain aspects, the lack of DAI may lead to inefficient ACK/NAK operation on PUSCH, since DAI indicates the total number of DL assignments, which helps the UE detect missing DL grants. Double PHICH resource in one subframe also increases DL overhead. In an aspect, a legacy UE may also need to be indicated a 4:6 configuration due to PHICH resource reservation, which means that legacy UEs may not enjoy high DL throughput that is possible via other DL/UL subframe configurations.

Aspects of the present disclosure, however, may help address one or more of these issues by utilizing multiple reference uplink/downlink (UL/DL) configurations. In certain aspects, an information field in a DCI (downlink control information) may be interpreted differently, depending on a reference UL/DL configuration. For example, to improve HARQ efficiency on UL (e.g., in response to DL transmissions), even if the UL reference configuration (e.g., for UL HARQ timing) is configuration #0, the 2-bit UL index in UL grants (e.g, DCI formats 0 and/or 4) may be re-interpreted to be DAI, if the DL reference configuration is not #0.

A first reference configuration may be identified for UL HARQ, a second reference configuration may be identified for DL HARQ, and an information field in a DCI for UL scheduling may be interpreted based on the second reference configuration. More generally, such a technique may be described as, identifying a first reference configuration for a first link, identifying a second reference configuration for a second link, and interpreting an information field in a DCI for scheduling in the first link based on the second reference configuration.

Thus, by doing so, the DAI in UL grants may be used to indicate the total number of DL assignments, even if the UL reference configuration is #0. In an aspect, if there is a need to still schedule two UL subframes in one DL subframe, two PDCCHs may be used to schedule the two UL subframes. In order to identify which UL subframe a PDCCCH is intended for, one or more properties associated with the PDCCH may be used. As an example, the PDCCH with a lower starting (E)CCE index may be used to schedule the first UL subframe, and the PDCCH with a higher starting (E)CCE index may be used to schedule the first UL subframe.

In reality, the need to schedule two UL subframes when there is DL heavy traffic may not be that high. As a result, it may be worth tolerating some DL overhead e.g., (two PDCCH transmissions) for the benefit of UL overhead (e.g., more efficient ACK/NAK payload).

The re-interpretation of an information field in an uplink grant based on a DL HARQ reference configuration may be hardcoded or signaled. For example, in certain aspects, a UE may determine how to interpret the information field based on a DL HARQ reference configuration. In alternative aspects, a UE may be indicated how to interpret the information field under a DL HARQ reference configuration.

In certain aspects, to improve operation efficiency, two or more reference configurations may be introduced for DL HARQ and/or UL HARQ.

For example, there may be at least two DL HARQ reference configurations and one UL HARQ reference configuration, one DL HARQ reference configuration and at least two UL HARQ reference configurations, or at least two DL HARQ reference configurations and at least two UL HARQ reference configurations.

In one case, given that there are two TDD switching periodicities, 5 ms and 10 ms, one reference configuration may be defined for 5 ms switching periodicity and another reference configuration may be defined for 10 ms switching periodicity.

In another case, given that the 9:1 configuration #5 contains extreme DL:UL ratio, while all other configurations have at most 4:1 DL:UL ratio, one reference configuration may be based on the 9:1 configuration, and another reference configuration may be based on a 4:1 DL/UL ratio configuration (e.g., configuration #2).

Figure 10A:
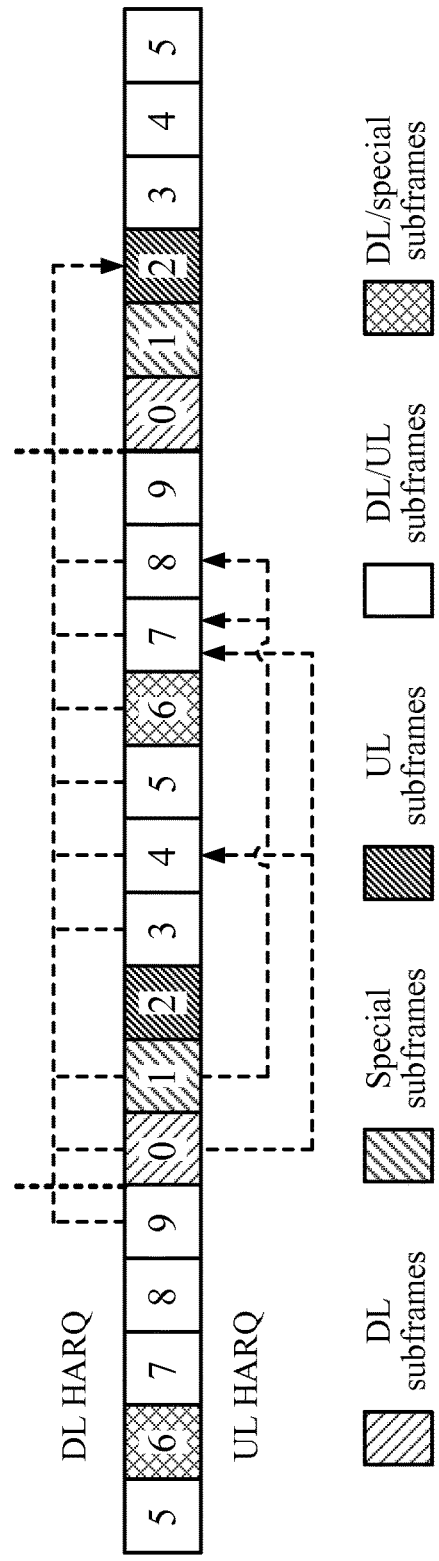
FIGS. 10a and 10b illustrate an example use with two DL reference configurations and one UL reference configuration, in accordance with certain aspects of the present disclosure.
Figure 10B:
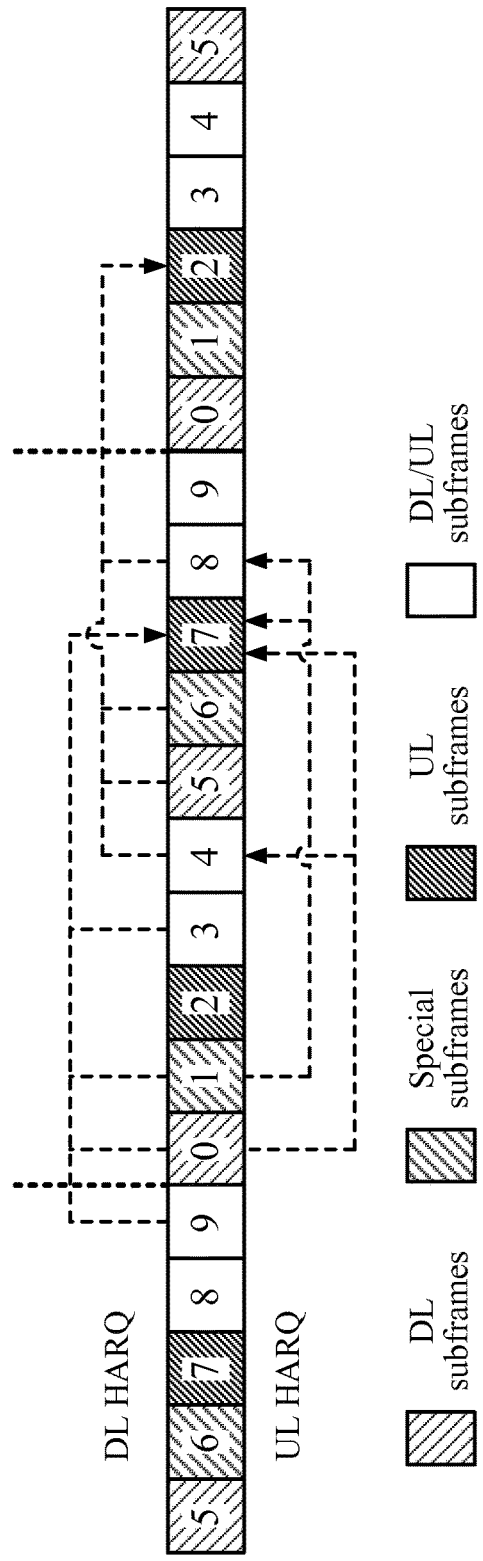

FIGS. 10a and 10b illustrate an example use with two DL reference configurations and one UL reference configuration. FIG. 10a illustrates a case where the UL reference configuration is TDD configuration #0, while the first DL reference configuration is TDD configuration #5. As illustrated in FIG. 10a, each UL subframe provides ACK/NAK feedback for 9 DL subframes (e.g., including special subframes).

FIG. 10b illustrates another case where, the UL reference configuration #5 is used in combination with a second DL reference TDD configuration #2. In this case, each UL subframe provides ACK/NAK feedback for 4 DL subframes (e.g., including special subframes).

Figure 11A:
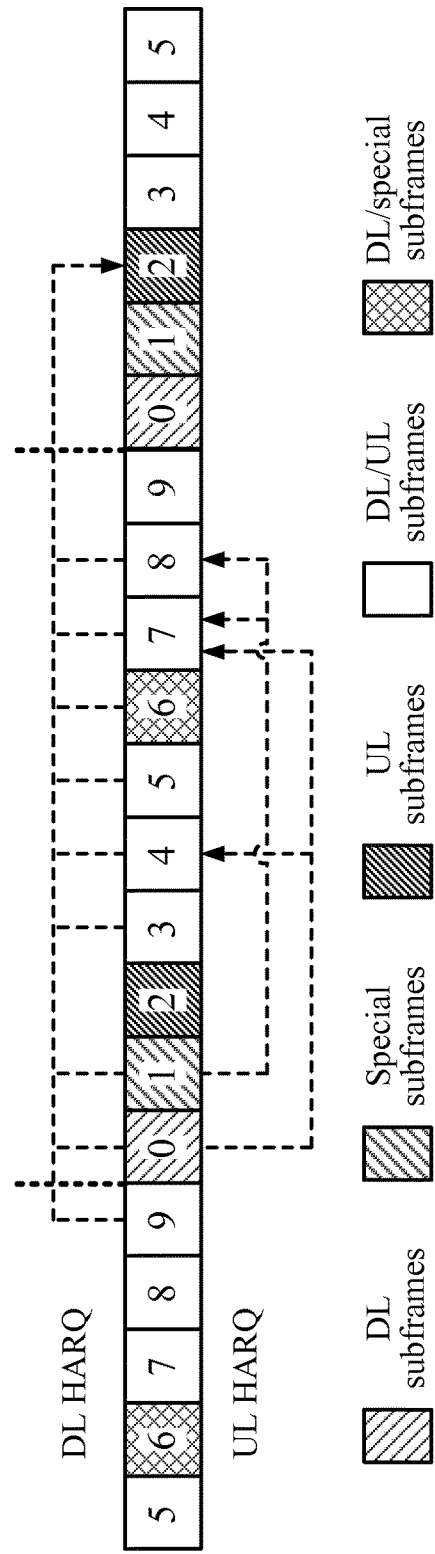
FIGS. 11a and 11b illustrate an example use with two DL reference configurations and two UL reference configurations, in accordance with certain aspects of the present disclosure.
Figure 11B:
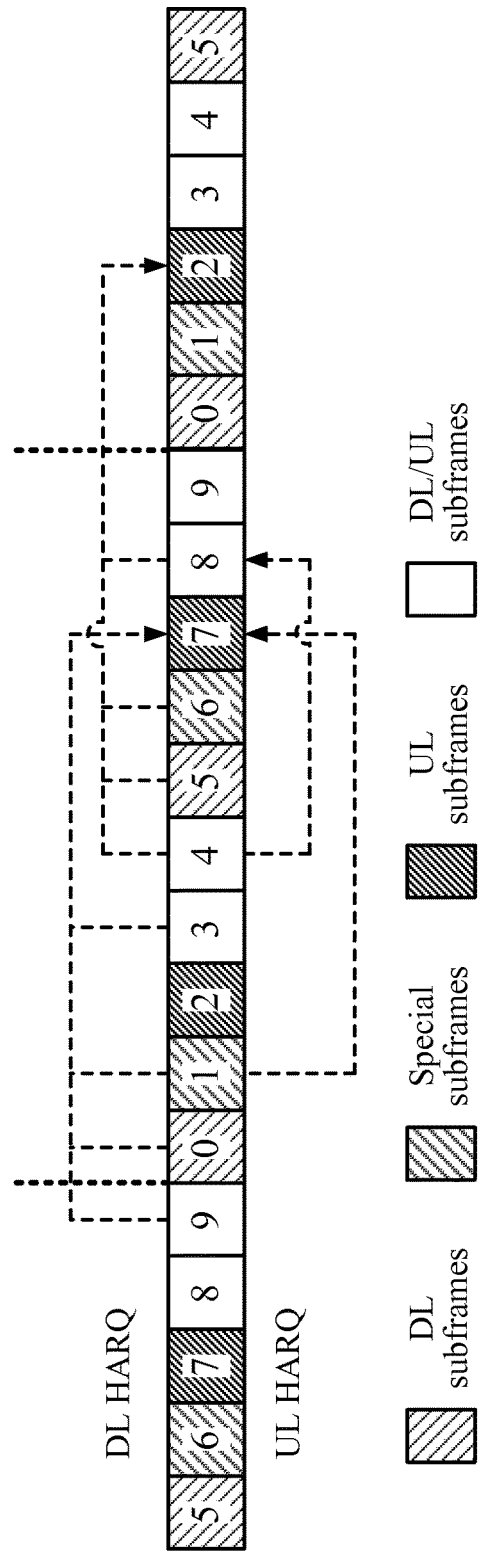

FIGS. 11a and 11b illustrate an example use with two DL reference configurations and two UL reference configurations. As illustrated in FIG. 11a, in a first set there may be a DL reference configuration of DL/UL subframe configuration #5, and UL reference configuration of DL/UL subframe configuration #0. As illustrated in FIG. 11b, a second set may have a DL reference configuration of DL/UL subframe configuration #2, and UL reference configuration of DL/UL subframe configuration #1.

In this case, there may be DAI in UL grants for indicating the total number scheduled DL subframes for more efficient ACK/NAK feedback.

In certain aspects, different reference UL/DL configurations may be signaled in various ways.

For example, the two or more reference configurations for DL HARQ and/or UL HARQ operations may be semi-statically or dynamically signaled. Semi-static signaling may be in the form of broadcast (e.g., in SIB1), or unicast (e.g., RRC configuration). Dynamic signaling may also be in the form of broadcast (e.g., using PCFICH, where PHICH duration in PBCH may be set to "extended duration" such that PCFICH values may be used to indicate one out of up to 4 reference configurations), or unicast (e.g., as part of DCI in DL and/or UL assignments). Semi-static signaling may be preferable in some cases, for example, in which the eNB may, based on the actual traffic and/or load conditions of an associated network, determine a best reference configuration in a semi-static manner to provide a better or the best tradeoff between efficiency and the flexibility in dynamic adaptation of DL/UL subframe configuration.

Alternatively, a reference subframe configuration for DL and/or UL HARQ operation may be derived implicitly, for example by a UE. As an example, an eNB may signal to a UE a set of anchor subframes, where the anchor subframes are the subframes without change of transmission directions (e.g., UL or DL). In an aspect, the signaling may be bitmap based. For example, a U subframe indicated in the signaling as an anchor subframe is not expected by the UE to change to D or S in a dynamic manner. Similarly, a D or S subframe indicated as an anchor subframe is not expected by the UE to change to U in a dynamic manner. As a result, a reference configuration may be determined by a UE based on the set of anchor subframes for DL and UL HARQ operations, respectively. As an example, a UE may determine a reference subframe configuration for DL HARQ operation based on the set of anchor subframes and assuming all other non-anchor subframes are D or S subframes. Similarly, a UE may determine a reference subframe configuration for UL HARQ operation based on the set of anchor subframes and assuming all other non-anchor subframes are UL subframes.

In an aspect, the DL HARQ reference configuration may be separately defined from the UL HARQ reference configuration. Alternatively, the reference configurations for DL HARQ and UL HARQ may be jointly defined.

It may be noted that although DL and/or UL HARQ operation is described as a primary application based on one or more sets of reference subframe configuration, the one or more sets of reference configuration may be further used for other features. As an example, uplink control information (UCI) such as one or more of periodic channel state information (e.g., feedback), scheduling request, sounding reference signal, etc., may be transmitted based on the one or more sets of reference subframe configurations. A UE may refrain from transmitting UCI, especially those of periodic nature, based on a DL reference subframe configuration instead of a UL reference subframe configuration. One or more sets of configurations for UCI may be configured for a UE associated with each of the one or more sets of reference subframe configurations, respectively.

Figure 12:
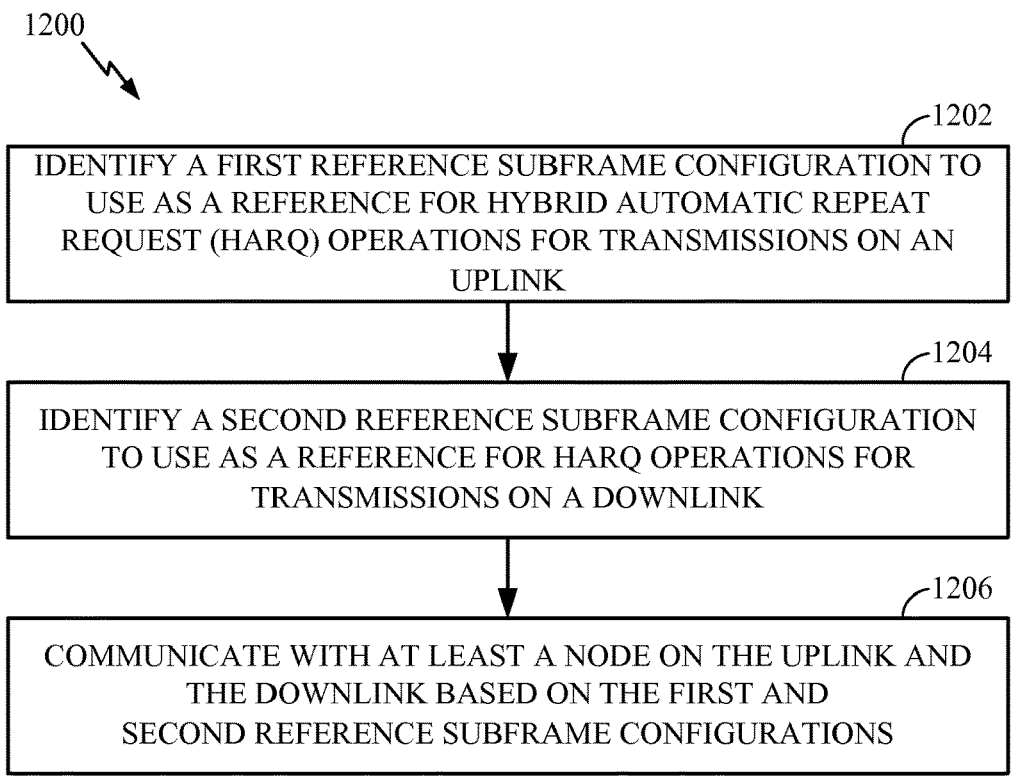
FIG. 12 illustrates example operations performed, for example, by a user equipment (UE) in an effort to perform interference management, according to certain aspects of the present disclosure.

FIG. 12 illustrates example operations 1200 performed, for example, by a UE. At 1202, the UE may identify a first reference subframe configuration to use as a reference for HARQ operations (e.g., HARQ timing) for transmissions on an uplink. At 1204, the UE may identify a second reference subframe configuration to use as a reference for HARQ operations for transmissions on a downlink. At 1206, the UE may communicate with at least a node (e.g., another node) on the uplink and the downlink based on the first and second reference subframe configurations.

In certain aspects, the UE may further identify a current subframe configuration for sending transmissions on the uplink and receiving transmissions on the downlink, wherein the current subframe configuration is different from at least one of the first or second reference subframe configurations.

In an aspect, the second reference subframe configuration for transmissions on the downlink is identified from at least two reference subframe configurations. In an aspect, the at least two reference subframe configurations comprise at least one of time division duplex (TDD) Uplink/Downlink (UL/DL) subframe configuration #2 and TDD UL/DL subframe configuration #5, or TDD UL/DL subframe configuration of a 5 ms switching periodicity and TDD UL/DL subframe configuration of a 10 ms switching periodicity.

In certain aspects, the UE may further interpret an information field in a downlink control information (DCI) format for scheduling on the uplink based on the second reference subframe configuration, wherein for at least one second reference subframe configuration, interpreting an information field in a DCI format for scheduling on the uplink based on the second reference subframe configuration includes interpreting the uplink index field as at least one of a downlink assignment field indicating a total number of downlink assignments or an uplink index field indicating one or more uplink subframes to be scheduled.

In certain aspects, at least the second reference subframe configuration for transmissions on the downlink is received semi-statically via radio resource control (RRC) signaling. In certain aspects, at least the first reference subframe configuration for transmissions on the uplink is received via broadcast signaling including a System Information Block (SIB) Type 1.

In certain aspects, the UE may further determine at least one of a number of HARQ processes, a scheduling timing, or HARQ timing for the uplink based on the first reference subframe configuration, and determine at least one of a number of HARQ processes or HARQ timing for the downlink based on the second reference subframe configuration.

In certain aspects, the UE may further determine transmission of at least one of a periodic channel state information feedback and a periodic scheduling request based on the second reference subframe configuration.

In certain aspects, the HAR operations may include HARQ timing.

Figure 13:
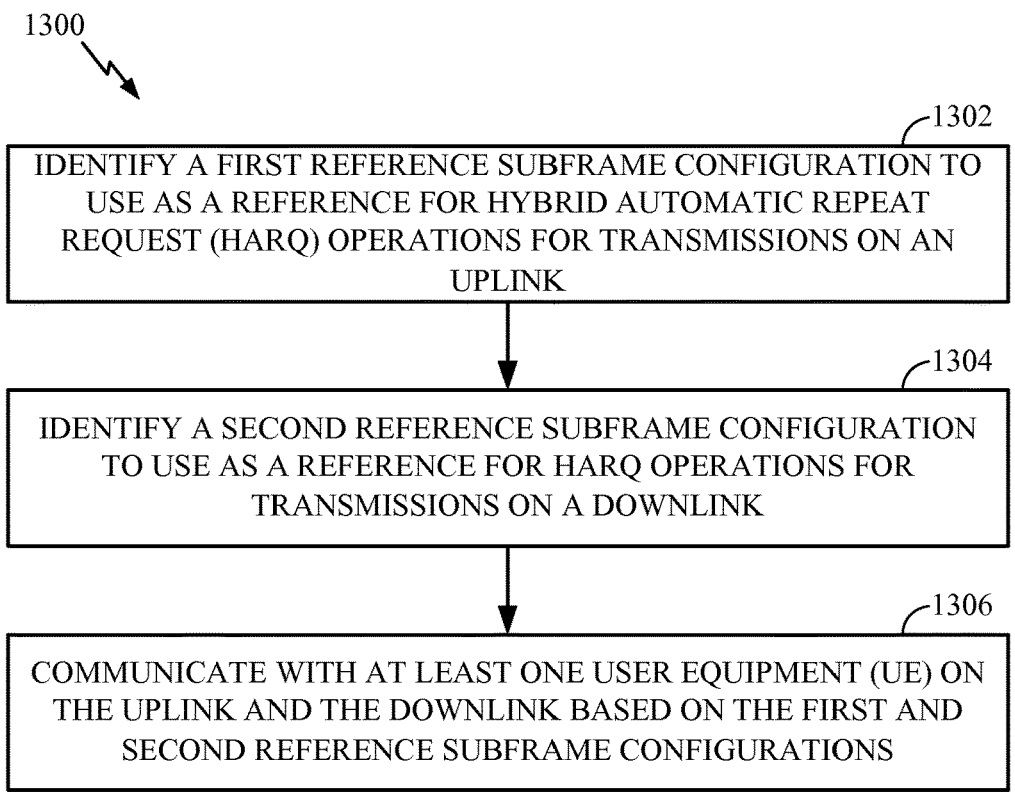
FIG. 13 illustrates example operations performed, for example, by a base station, in accordance with certain aspects of the present disclosure.

FIG. 13 illustrates example operations 1300 performed, for example, by a base station, such as an eNB. At 1302, the eNB may identify a first reference subframe configuration to use as a reference for hybrid automatic repeat request (HARQ) operations (e.g., HARQ timing) for transmissions on an uplink. At 1304, the eNB may identify a second reference subframe configuration to use as a reference for HARQ operations for transmissions on a downlink. At 1306, the eNB may communicate with at least one UE on the uplink and the downlink based on the first and the second reference subframe configurations.

In certain aspects, the second reference subframe configuration for transmissions on the downlink is identified from at least one of time division duplex (TDD) Uplink/Downlink (UL/DL) subframe configuration of a 5 ms switching periodicity or TDD UL/DL subframe configuration of a 10 ms switching periodicity.

In certain aspects, the eNB may further provide information in an information field in a downlink control information (DCI) format for scheduling in the uplink, the information provided based on the second reference subframe configuration, wherein the information field comprises an uplink index field, wherein the information field comprises an uplink index field, wherein for at least one second reference subframe configuration, providing information in an information field in a DCI format for scheduling in the uplink includes providing, in an uplink index field, at least one of downlink assignment information indicating a total number of downlink assignments or information indicating one or more uplink subframes to be scheduled.

In certain aspects, at least the second reference subframe configuration for transmissions on the downlink is semi-statically signaled via radio resource control (RRC) signaling. In certain aspects, at least the first reference subframe configuration for transmissions on the uplink is signaled via broadcast signaling including a System Information Block (SIB) Type 1.

In certain aspects, the eNB may further identify another reference subframe configuration for at least one of the transmissions on the uplink or the transmissions on the downlink based on actual traffic or load of a network over which the BS communicates with the UE.

In certain aspects, HARQ operations may include HARQ timing.

Figure 14:
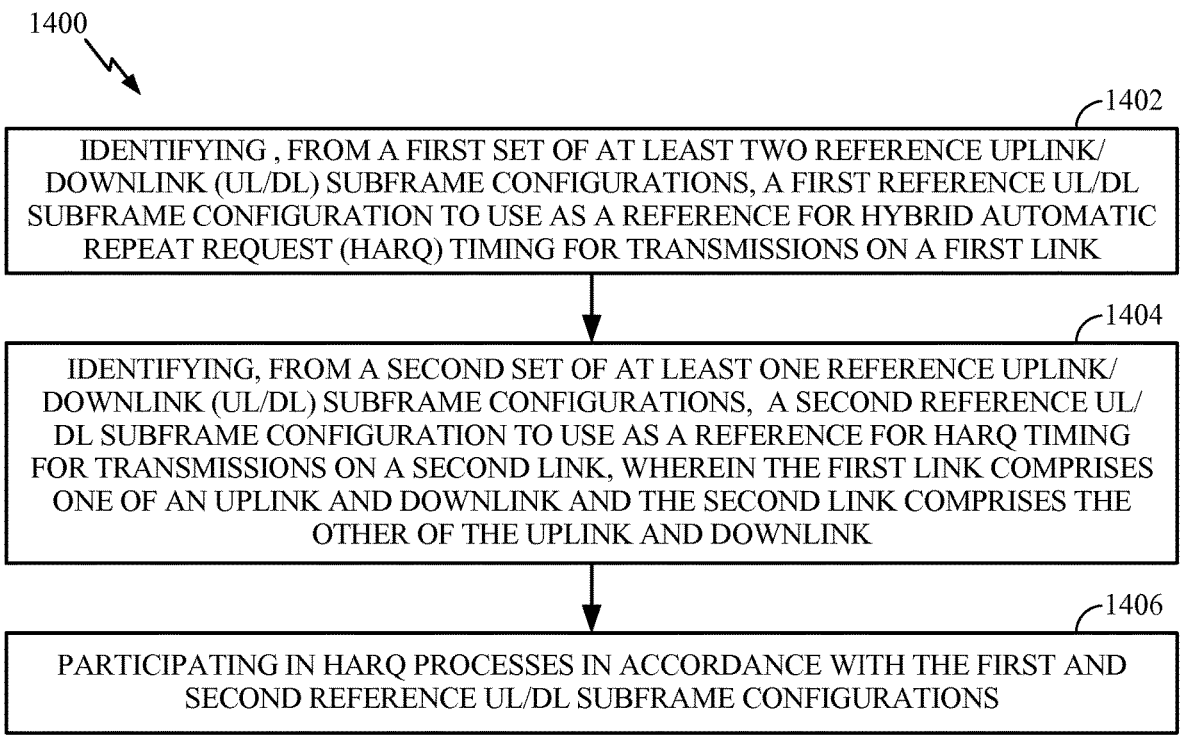
FIG. 14 illustrates example operations performed, for example, by a user equipment (UE), in accordance with certain aspects of the present disclosure.

FIG. 14 illustrates example operations 1400 performed, for example, by a UE. At 1402, the UE may identify, from a first set of at least two reference uplink/downlink (UL/DL) subframe configurations, a first reference UL/DL subframe configuration to use as a reference for hybrid automatic repeat request (HARQ) timing for transmissions on a first link. At 1404, the UE may identify, from a second set of at least one reference uplink/downlink (UL/DL) subframe configurations, a second reference UL/DL subframe configuration to use as a reference for HARQ timing for transmissions on a second link, wherein the first link comprises one of an uplink and downlink and the second link comprises the other of the uplink and downlink. At 1406, the UE may participate in HARQ processes in accordance with the first and second reference UL/DL subframe configurations.

Figure 15:
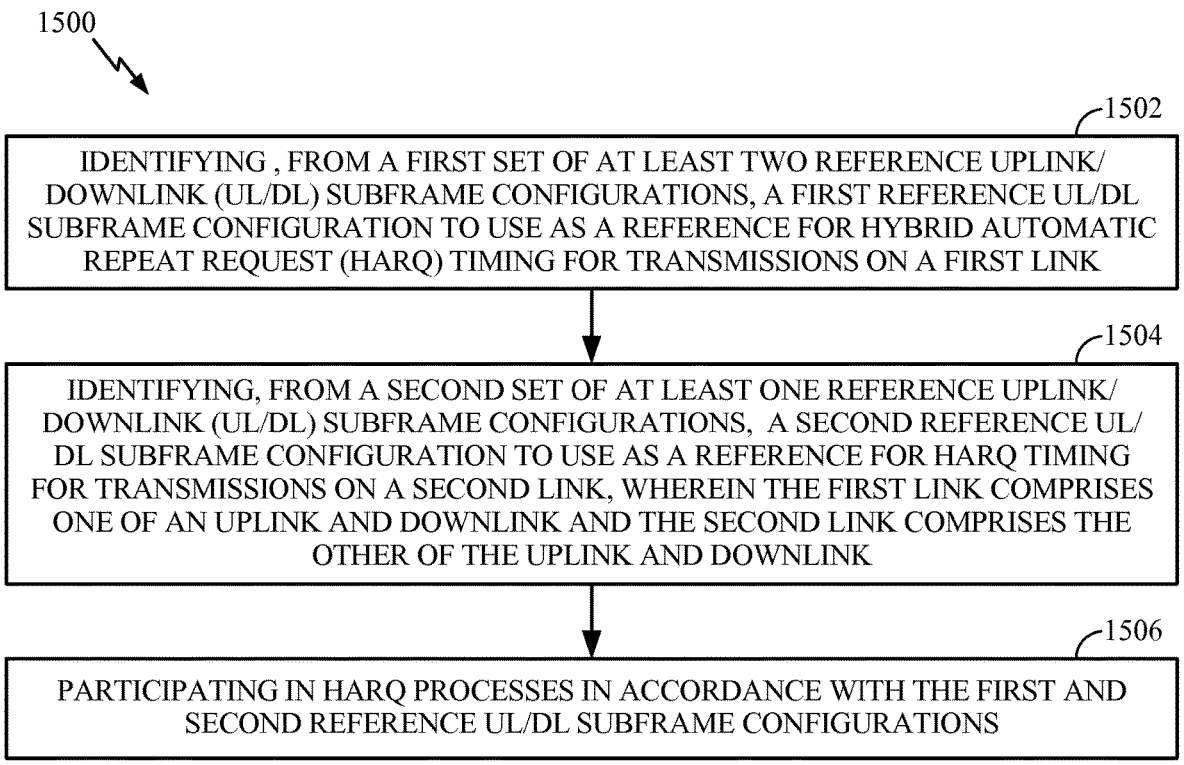
FIG. 15 illustrates example operations performed, for example, by a base station, in accordance with certain aspects of the present disclosure.

FIG. 15 illustrates example operations 1500 performed, for example, by a base station, such as an eNB. At 1502, the eNB may identify, from a first set of at least two reference uplink/downlink (UL/DL) subframe configurations, a first reference UL/DL subframe configuration to use as a reference for hybrid automatic repeat request (HARQ) timing for transmissions on a first link. At 1504, the eNB may identify, from a second set of at least one reference uplink/downlink (UL/DL) subframe configurations, a second reference UL/DL subframe configuration to use as a reference for HARQ timing for transmissions on a second link, wherein the first link comprises one of an uplink and downlink and the second link comprises the other of the uplink and downlink. At 1506, the base station may participate in HARQ processes in accordance with the first and second reference UL/DL subframe configurations.

Thus, aspects of the present disclosure address issues of interference management, including interference mitigation, interference suppression and/or interference cancellation, to mitigate, suppress and/or cancel interference caused by interfering or potentially interfering signals from multiple services. In aspects, the present methods and apparatus include receiving at least two sets of configurations for at least one of a channel state information feedback, a scheduling request, or a sounding reference signal, and determining one set from the at least two sets of configurations for use based on at least one of the first identified set and the second identified set. In aspects, the present methods and apparatus include determining whether to transmit control information on a first link based on a second reference UL/DL subframe configuration.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
    identifying a first reference subframe configuration to use as a reference for hybrid automatic repeat request (HARQ) operations for transmissions on an uplink;
    identifying a second reference subframe configuration to use as a reference for HARQ operations for transmissions on a downlink;
    determining transmission of at least one of a periodic channel state information feedback and a periodic scheduling request based on the second reference subframe configuration; and
    communicating with at least a node on the uplink and the downlink based on the first and second reference subframe configurations,
    wherein at least the first reference subframe configuration for transmissions on the uplink is received via broadcast signaling including a System Information Block (SIB) Type 1.

2. The method of claim 1, further comprising identifying a current subframe configuration for sending transmissions on the uplink and receiving transmissions on the downlink, wherein the current subframe configuration is different from at least one of the first or second reference subframe configurations.

3. The method of claim 1, wherein the second reference subframe configuration for transmissions on the downlink is identified from at least two reference subframe configurations.

4. The method of claim 3, wherein the at least two reference subframe configurations comprise at least one of time division duplex (TDD) Uplink/Downlink (UL/DL) subframe configuration #2 and TDD UL/DL subframe configuration #5, or TDD UL/DL subframe configuration of a 5 ms switching periodicity and TDD UL/DL subframe configuration of a 10 ms switching periodicity.

5. The method of claim 1, further comprising:
    interpreting an information field in a downlink control information (DCI) format for scheduling on the uplink based on the second reference subframe configuration, wherein the information field comprises an uplink index field; and
    wherein for at least one second reference subframe configuration, interpreting an information field in a DCI format for scheduling on the uplink based on the second reference subframe configuration includes interpreting the uplink index field as at least one of a downlink assignment field indicating a total number of downlink assignments or an uplink index field indicating one or more uplink subframes to be scheduled.

6. The method of claim 1, wherein at least the second reference subframe configuration for transmissions on the downlink is received semi-statically via radio resource control (RRC) signaling.

7. The method of claim 1, further comprising:
    determining at least one of a number of HARQ processes, a scheduling timing, or HARQ timing for the uplink based on the first reference subframe configuration; and
    determining at least one of a number of HARQ processes or HARQ timing for the downlink based on the second reference subframe configuration.

8. The method of claim 1, wherein HARQ operations include HARQ timing.

9. A method for wireless communications by a base station (BS), comprising:
    identifying a first reference subframe configuration to use as a reference for hybrid automatic repeat request (HARQ) operations for transmissions on an uplink;
    identifying a second reference subframe configuration to use as a reference for HARQ operations for transmissions on a downlink; and
    communicating with at least one user equipment (UE) on the uplink and the downlink based on the first and second reference subframe configurations,
    wherein at least the first reference subframe configuration for transmissions on the uplink is signaled via broadcast signaling including a System Information Block (SIB) Type 1, and
    wherein transmission of at least one of a periodic channel state information feedback and a periodic scheduling request is determined based on the second reference subframe configuration.

10. The method of claim 9, wherein the second reference subframe configuration for transmissions on the downlink is identified from at least one of time division duplex (TDD) Uplink/Downlink (UL/DL) subframe configuration of a 5 ms switching periodicity or TDD UL/DL subframe configuration of a 10 ms switching periodicity.

11. The method of claim 9, further comprising:
    providing information in an information field in a downlink control information (DCI) format for scheduling in the uplink, the information provided based on the second reference subframe configuration, wherein the information field comprises an uplink index field; and
    wherein for at least one second reference subframe configuration, providing information in an information field in a DCI format for scheduling in the uplink includes providing, in an uplink index field, at least one of downlink assignment information indicating a total number of downlink assignments or information indicating one or more uplink subframes to be scheduled.

12. The method of claim 9, wherein at least the second reference subframe configuration for transmissions on the downlink is semi-statically signaled via radio resource control (RRC) signaling.

13. The method of claim 9, further comprising:
    identifying another reference subframe configuration for at least one of the transmissions on the uplink or the transmissions on the downlink based on actual traffic or load of a network over which the BS communicates with the UE.

14. The method of claim 9, wherein HARQ operations include HARQ timing.

15. An apparatus for wireless communications, comprising:
a processor configured to:
identify a first reference subframe configuration to use as a reference for hybrid automatic repeat request (HARQ) operations for transmissions on an uplink;
identify a second reference subframe configuration to use as a reference for HARQ operations for transmissions on a downlink;
determine transmission of at least one of a periodic channel state information feedback and a periodic scheduling request based on the second reference subframe configuration; and
communicate with at least a node on the uplink and the downlink based on the first and second reference subframe configurations,
wherein the processor is configured to receive at least the first reference subframe configuration for the uplink via broadcast signaling including System Information Block (SIB) Type 1; and
a memory coupled to the processor.

16. The apparatus of claim 15, wherein the processor is further configured to identify a current subframe configuration for sending transmissions on the uplink and receiving transmissions on the downlink, wherein the current subframe configuration is different from at least one of the first or second reference subframe configurations.

17. The apparatus of claim 15, wherein the second reference subframe configuration for transmissions on the downlink is identified from at least two reference subframe configurations and the at least two reference subframe configurations comprise time division duplex (TDD), Uplink/Downlink (UL/DL) subframe configuration of a 5 ms switching periodicity and TDD UL/DL subframe configuration of a 10 ms switching periodicity.

18. The apparatus of claim 15, further comprising:
wherein the processor is further configured to interpret an information field in a downlink control information (DCI) format for scheduling on the uplink based on the second reference subframe configuration, wherein the information field comprises an uplink index field; and
wherein for at least one second reference subframe configuration, interpreting an information field in a DCI format for scheduling on the uplink based on the second reference subframe configuration includes interpreting the uplink index field as at least one of a downlink assignment field indicating a total number of downlink assignments or an uplink index field indicating one or more uplink subframes to be scheduled.

19. The apparatus of claim 15, wherein the processor is further configured to receive at least the second reference subframe configuration for the downlink semi-statically via radio resource control (RRC) signaling.

20. The apparatus of claim 15, the processor is further configured to:
determine at least one of a number of HARQ processes, a scheduling timing or HARQ timing for the uplink based on the first reference subframe configuration; and
determine at least one of a number of HARQ processes or HARQ timing for the downlink based on the second reference subframe configuration.

21. An apparatus for wireless communications, comprising:
a processor configured to:
identify a first reference subframe configuration to use as a reference for hybrid automatic repeat request (HARQ) operations for transmissions on an uplink;
identify a second reference subframe configuration to use as a reference for HARQ operations for transmissions on a downlink; and
communicate with at least one user equipment (UE) on the uplink and the downlink based on the first and second reference subframe configurations,
wherein the processor is further configured to signal at least the first reference subframe configuration for the uplink via broadcast signaling including System Information Block (SIB) Type 1, and
wherein transmission of at least one of a periodic channel state information feedback and a periodic scheduling request is determined based on the second reference subframe configuration; and
a memory coupled to the processor.

22. The apparatus of claim 21, wherein the second reference subframe configuration for the downlink is identified from at least one of at least time division duplex (TDD) Uplink/Downlink (UL/DL) subframe configuration #2 or TDD UL/DL subframe configuration #5, or TDD UL/DL subframe configuration of a 5 ms switching periodicity or TDD UL/DL subframe configuration of a 10 ms switching periodicity.

23. The apparatus of claim 21, wherein the processor is further configured to:
provide information in an information field in a downlink control information (DCI) format for scheduling in the uplink, the information provided based on the second reference subframe configuration, wherein the information field comprises an uplink index field; and
wherein for at least one second reference subframe configuration, providing information in an information field in a DCI format for scheduling in the uplink includes providing, in an uplink index field, at least one of downlink assignment information indicating a total number of downlink assignments or information indicating one or more uplink subframes to be scheduled.

24. The apparatus of claim 21, wherein the processor is further configured to signal at least the second reference subframe configuration for the downlink semi-statically via Radio Resource Control (RRC) signaling.

25. The apparatus of claim 21, wherein the processor is further configured to identify another reference subframe configuration for at least one of the uplink or the downlink based on actual traffic or load of a network over which the apparatus communicates with the UE.

* * * * *